United States Patent
Hager et al.

(10) Patent No.: US 8,598,248 B2
(45) Date of Patent: Dec. 3, 2013

(54) FLEXIBLE POLYURETHANE FOAMS MADE FROM ALKOXYLATED NATURAL OIL

(75) Inventors: Stanley L. Hager, Cross Lanes, WV (US); Edward P. Browne, Cologne (DE); Jack R. Reese, Hurricane, WV (US); Don S. Wardius, Pittsburgh, PA (US); Micah N. Moore, Red House, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 12/837,561

(22) Filed: Jul. 16, 2010

(65) Prior Publication Data

US 2012/0016048 A1    Jan. 19, 2012

(51) Int. Cl.
*C08G 18/00* (2006.01)

(52) U.S. Cl.
USPC .......................... 521/174; 521/155; 521/170

(58) Field of Classification Search
USPC ........................................ 521/170, 174, 155
See application file for complete search history.

(56) References Cited

U.S. PATENT DOCUMENTS

| | | | |
|---|---|---|---|
| 4,026,829 A * | 5/1977 | Samura et al. | 521/59 |
| 6,441,247 B1 | 8/2002 | Grosch et al. | |
| 6,734,273 B2 * | 5/2004 | Onder | 528/76 |
| 6,759,448 B2 * | 7/2004 | Toyota et al. | 521/174 |
| 7,094,811 B2 * | 8/2006 | Nodelman et al. | 521/174 |
| 2003/0158281 A1 * | 8/2003 | Parfondry et al. | 521/155 |
| 2006/0167125 A1 | 7/2006 | Bauer et al. | |
| 2008/0139685 A1 | 6/2008 | Reese et al. | |
| 2008/0161509 A1 * | 7/2008 | Ostrowski et al. | 526/64 |
| 2010/0160469 A1 | 6/2010 | Adkins et al. | |
| 2010/0298460 A1 | 11/2010 | Mijolovic et al. | |

FOREIGN PATENT DOCUMENTS

| | | |
|---|---|---|
| DE | 19840846 A1 | 3/2000 |
| EP | 1712576 A1 | 10/2006 |
| EP | 1842866 A1 | 10/2007 |
| EP | 0759450 B2 | 6/2010 |
| JP | H5163342 | 6/1993 |
| WO | 0222702 A1 | 3/2002 |
| WO | 2008138498 A1 | 11/2008 |
| WO | 2009029621 A1 | 3/2009 |
| WO | 2009032894 A1 | 3/2009 |

OTHER PUBLICATIONS

URIC® Technical Data Sheet, Dec. 2004, Itoh Oil Chemicals Co., Ltd., pp. 1-9.*

* cited by examiner

*Primary Examiner* — Melissa Rioja
(74) *Attorney, Agent, or Firm* — N. Denise Brown; Lyndanne M. Whalen

(57) ABSTRACT

The present invention provides flexible conventional polyurethane foams made from at least one polyisocyanate and at least one vegetable oil alkoxylated in the presence of a double metal cyanide (DMC) catalyst, optionally at least one non-vegetable oil-based polyol, generally in the presence of a blowing agent and optionally in the presence of a surfactant, pigment, flame retardant, catalyst or filler. The alkoxylated natural oil must have (a) an ethylene oxide content in the alkoxylated segment greater than 20% by weight, (b) a primary hydroxyl group content of at least 10%, with the sum of (a)+(b) being at least 30% but no greater than 60%, The alkoxylated natural oils are environmentally-friendly, bio-based polyols which can be used to increase the "green" content of polyurethane foams without having detrimental effects on foam properties.

27 Claims, No Drawings

FLEXIBLE POLYURETHANE FOAMS MADE FROM ALKOXYLATED NATURAL OIL

FIELD OF THE INVENTION

The present invention relates in general to polyurethanes, and more specifically, to flexible polyurethane foams, preferably, flexible, conventional free-rise slabstock polyurethane foams in which at least a portion of the petroleum-derived polyol is replaced with a natural oil, preferably, a vegetable oil that is alkoxylated, preferably in the presence of a double metal cyanide (DMC) catalyst. The alkoxylated natural oil has an ethylene oxide content in its alkoxylated segment of greater than 20% by weight, a primary hydroxyl group content of at least 10% and the sum of the percent ethylene oxide content and the percent primary hydroxyl group content is at least 30% but no greater than 60%.

As used herein, a polyol which is produced from petroleum derivatives with a low equivalent weight starter or initiator (i.e., an equivalent weight of less than 100) that is a renewable material such as glycerin or sorbitol is within the scope of the term "petroleum-derived polyol".

As used herein, a "natural oil" or a "bio-based oil" is any fatty acid triglyceride derived from vegetable, animal or other natural sources which can be hydroxylated or otherwise modified to generate a composition having an alkoxylated segment of greater than 20% by weight, a primary hydroxyl group content of at least 10% and a sum of percent ethylene oxide content and percent primary hydroxyl group content of at least 30% but no greater than 60%.

BACKGROUND OF THE INVENTION

Polyurethane foams have found extensive use in a multitude of industrial and consumer applications. This popularity is due to polyurethane's wide ranging mechanical properties and the excellent cushioning performance of the foamed product and its ability for the foam to be relatively easily manufactured. Furniture and mattresses, for example, rely on the durability and cushioning performance of polyurethane foams to provide comfort and support over years of use. Automobiles also, contain numerous polyurethane foam components, such as seats, trim and other interior parts. Polyurethane foams have traditionally been categorized as being flexible (or semi-rigid) or rigid foams; with flexible foams generally being softer, less dense, more pliable and more subject to structural rebound subsequent loading than are rigid foams. Flexible polyurethane foams have been further characterized as being conventional or high resilience (also described as high support); wherein the high resilience foams are produced from polyols having a high primary hydroxyl content, typically greater than 50%, and generally require crushing to fully open the foam and achieve good air flow. Conventional foams typically are produced by a free-rise slabstock process from polyols with low primary hydroxyl content, usually less than 10%, and do not require crushing to fully open the foam.

The production of polyurethane foams is well known to those skilled in the art. Polyurethanes are formed from the reaction of NCO groups with hydroxyl groups. The most common method of polyurethane production is via the reaction of a polyol and an isocyanate which forms the backbone urethane group. Cross linking agents, blowing agents, catalysts and other additives may also be included in the polyurethane formulation as needed.

Polyols used in the production of polyurethanes are typically petrochemical in origin, being generally derived from propylene oxide, ethylene oxide and various starters such as ethylene glycol, propylene glycol, glycerin, sucrose and sorbitol. Polyester polyols and polyether polyols are the most common polyols used in polyurethane production. For semi-rigid foams, polyester or polyether polyols with molecular weights of from about 300 to 2,000 are generally used, whereas for flexible, foams longer chain polyols with molecular weights of from about 1,000 to 10,000 are typically used. Polyester and polyether polyols can be selected to allow the engineering of a particular polyurethane elastomer or foam having desired final toughness, durability, density, flexibility, compression set ratios and modulus and hardness qualities. Generally, higher molecular weight polyols and lower functionality polyols tend to produce more flexible foams than do lower molecular weight polyols and higher functionality polyols.

Petroleum-derived components such as polyester and polyether polyols pose several disadvantages. Use of such polyester or polyether polyols contributes to the depletion of oil, which is a non-renewable resource. Also, the production of a polyol requires the investment of a great deal of energy because the oil to make the polyol must be drilled, extracted and transported to a refinery where it is refined and processed to yield the finished polyol. As the consuming public becomes increasingly aware of the environmental impact of this production chain, consumer demand for "greener" products will continue to grow. To help reduce the depletion of oil whilst satisfying this increasing consumer demand, it would be advantageous to partially or wholly replace petroleum-derived polyester or polyether polyols used in the production of polyurethane elastomers and foams with more versatile, renewable and more environmentally responsible components.

A number of companies have announced goals of a certain percentage of their products being based on renewable resources and preferences for products based on renewable resources have begun to appear in some government regulations. These factors combined with the ever escalating costs of petroleum-based products have given added impetus to the efforts to develop foam products based on various oils derived from plants.

Unfortunately, the use of the petroleum-based products is a highly developed industry and years of optimization have created products tailored to meet strict industry requirements. Thus, the attempted substitution of products based on renewable resources has been constrained by several factors including the difficulty of developing "drop in" type products which can be added without significantly affecting the processing characteristics and without substantial loss of product quality. For example, although castor oil-based polyurethanes have been known for decades, their use has generally been limited to a few applications such as hydrophobic coatings and certain sealants where the typical polyurethane properties are not required. There is a continuing need to develop polyethers based on these natural products which can meet industry requirements for foam quality and processability Although the patent and technical literature contains many references related to the use of either castor oil or castor polyols (See J. H. Saunders and K. C. Frisch, Polyurethanes Chemistry and Technology II. Technology Part II (High Polymers Vol. XVI), Interscience Publishers, 1964, pages 32-37, See also references listed in WO 2004/020497), a large fraction of this art teaches the use of prepolymers to obtain a useful foam article. Although prepolymer technology is still used in some applications such as many types of coatings, the majority of manufacturers in the flexible foam industry now employ one-shot processes in which castor oil finds very little utility.

Another drawback to the use of polyols based on castor oil is that since the 1950's, these polyols have been produced by alkoxylating with potassium hydroxide catalysis. Despite the fact that KOH is a very good catalyst for the production of polyethers from propylene oxide and ethylene oxide using starters such a glycerin, trimethylolpropane and sorbitol, extensive side reactions occur with natural products containing an ester function. As those skilled in the art are aware, potassium hydroxide is a catalyst both for the alkoxylation and transesterification reactions. Thus, potassium hydroxide catalyzes hydrolysis and competitive transesterification reactions during the alkoxylation reaction creating a wide range of esters as the hydroxyl end groups are continually exchanged at the ester function thereby creating broad molecular weight distributions. These molecular weight distribution products can have deleterious effects on foams made from base-catalyzed polyols.

In the late 1990's, the polyol production industry embarked on a major change as double metal cyanide (DMC) catalysts started to displace potassium hydroxide as the catalyst of choice for the production of polyols used to make slab polyurethane. DMC catalysts do not appreciably catalyze the transesterfication reaction and thus for the first time, polyols based on natural product esters could be produced without the inherent transesterification obtained with potassium hydroxide.

Asahi Glass (Kokai H5-163342) reported the production of EO/PO based polyethers using castor oil as a starter. The polydispersities of the resultant polyether products confirmed that a substantial change had occurred given that the obtained polydispersities were in the range of 1.10 to 1.13; whereas, the corresponding potassium hydroxide-catalyzed polyols had polydispersities in the range of 1.7 to 1.8. For the first time, an economical method had been developed for the production of polyethers based on renewable resource esters. Unfortunately, Asahi only reported the production of the polyethers and was silent on the suitability of those products in flexible polyurethane foams.

U.S. Published Patent Application 2006/0167125 discloses a method for producing low-emission polyurethane soft foams with a polyether alcohol prepared by addition of alkylene oxides onto compounds derived from renewable raw materials using a DMC catalyst. The polyether polyols suitable for the production of conventional slabstock polyurethane foams must have a high content of secondary hydroxyl groups and an ethylene oxide content in the polyether chain of no more than 30%. The polyether polyols preferred for the production of molded flexible polyurethane foams have a primary hydroxyl content of greater than 50% and particularly those with an ethylene oxide block at the end of the chain or be based solely on ethylene oxide. The foams produced in accordance with the method disclosed in U.S. 2006/0167125 are taught to have reduced crack formation and reduced compressive sets. U.S. 2006/0167125 does not, however, teach that free-rise, slabstock polyurethane foams having good processing characteristics could be produced with polyether polyols having a primary hydroxyl group content of greater than 10%. In particular, the teachings of this patent would not suggest that near "drop in" conventional slabstock foam processing and properties could be achieved at primary OH levels greater than 10% and ethylene oxide contents above 30%.

The belief that polyols with low primary OH (<10%) content and low ethylene oxide content (<20%) are preferred for conventional slabstock foam production is also supported in that essentially all major commercial petroleum based conventional slabstock polyols fall within these ranges.

Therefore, a need continues to exist in the art for flexible conventional polyurethane slabstock foams made with environmentally-friendly, renewable components having primary hydroxyl group contents of greater than 10% where such components will provide foam properties and near "drop-in" processing as replacements for petrochemical based polyols.

SUMMARY OF THE INVENTION

Accordingly, the present invention provides flexible conventional polyurethane foams made from at least one polyisocyanate and at least one natural oil alkoxylated in the presence of a double metal cyanide (DMC) catalyst, optionally at least one petroleum-based polyol, generally in the presence of at least one blowing agent, and optionally in the presence of at least one of surfactants, pigments, flame retardants, catalysts and fillers. The alkoxylated natural oils must satisfy three criteria. More specifically, these alkoxylated natural oils must have an ethylene oxide content in the alkoxylated segment of greater than 20%, a primary hydroxyl group content of at least 10%, and the sum of the ethylene oxide content and primary hydroxyl group content must be at least 30% but no greater than 60%. The alkoxylated natural oils are environmentally-friendly, "bio-based" polyols and partially or completely replace the petroleum-derived polyol(s) in a polyurethane foam-forming formulation without the need for appreciably altering the formulation. The inventive flexible foams are usable in many applications.

These and other advantages and benefits of the present invention will be apparent from the Detailed Description of the Invention herein below.

DETAILED DESCRIPTION OF THE INVENTION

The present invention will now be described for purposes of illustration and not limitation with specific reference to vegetable oils alkoxylated via DMC catalysis, although other polyols produced by alkoxylation of other natural, non-vegetable oils are also within the scope of the present invention. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a flexible conventional polyurethane foam containing the reaction product of at least one polyisocyanate and at least one natural oil, preferably a vegetable oil alkoxylated in the presence of a double metal cyanide (DMC) catalyst, optionally at least one petroleum-based polyol, generally in the presence of at least one blowing agent, and optionally in the presence of at least one of surfactants, pigments, flame retardants, catalysts and fillers.

The present invention further provides a process for making a flexible conventional polyurethane foam involving reacting at least one polyisocyanate and at least one natural oil, preferably, vegetable oil alkoxylated in the presence of a double metal cyanide (DMC) catalyst, optionally at least one non-vegetable oil-based polyol, generally in the presence of at least one blowing agent, and optionally at least one of surfactants, pigments, flame retardants, catalysts and fillers.

The natural oil-based, preferably, vegetable oil-based polyol partially or completely replaces the petroleum-derived polyol(s) that would typically be used in producing a flexible polyurethane foam. In addition, the vegetable oil-based polyols can be employed in the foam forming process without appreciably altering the foam formulation. The preferred vegetable oil is castor oil, although the inventors herein contemplate that other vegetable oils, such as sunflower, canola, linseed, cottonseed, tung, palm, poppy seed, corn and peanut oil could be hydroxylated or otherwise modified to be used in accordance with the present invention. Other fatty acid triglycerides derived from animal or other natural sources capable of being hydroxylated or otherwise modified for alkoxylation to produce a composition satisfying the ethylene oxide content, primary hydroxyl group content and sum of ethylene oxide and primary hydroxyl group criteria of the present invention are also suitable compositions for use in accordance with the present invention and are within the scope of the present invention. The alkylene oxides useful in alkoxylating this vegetable oil include, but are not limited to, ethylene oxide, propylene oxide, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. It is generally undesirable to employ ethylene oxide alone, but mixtures of propylene oxide and ethylene oxide with high ethylene oxide content, i.e. up to 85 mole percent, may be used effectively. Propylene oxide or mixtures of propylene oxide with ethylene oxide or another alkylene oxide are preferred for alkoxylating the vegetable oil.

The alkylene oxides employed in producing the alkoxylated vegetable oil of the present invention must be used in amounts such that (i) the alkoxylation product will have an ethylene oxide content in the alkoxylated segment of greater than 20% by weight, preferably, greater than 22% by weight, most preferably, from 25 to 32%; (ii) the alkoxylation product will have a primary hydroxyl group content of at least 10%, preferably, at least 12%, most preferably, from 15 to 22%; and (iii) the sum of (i) plus (ii) be at least 30% but no greater than 60%, preferably, at least 30% but no greater than 50%, most preferably from 40 to 50%.

Other polymerizable monomers may be used as well, e.g. polycarboxylic anhydrides (phthalic anhydride, trimellitic anhydride, pyromellitic anhydride, methylendomethylene tetrahydrophthalic anhydride, endomethylene tetrahydrophthalic anhydride, chlorendic anhydride and maleic anhydride) lactones and other monomers as disclosed in U.S. Pat. Nos. 3,404,109; 5,145,883; and 3,538,043. The alkoxylated vegetable oil-based polyols may optionally be "capped" with ethylene oxide, as known in the art and disclosed e.g., in U.S. Pat. Nos. 4,355,188; 4,721,818; and 5,563,221.

As mentioned above, the vegetable oil is alkoxylated in the presence of a double metal cyanide (DMC) catalyst. Any double metal cyanide (DMC) catalyst may be used. The resultant vegetable oil-based polyol will have a higher molecular weight which offers improved comfort in the polyurethane foams made therewith. Suitable double metal cyanide (DMC) catalysts are known to those skilled in the art. Double metal cyanide complex (DMC) catalysts are non-stoichiometric complexes of a low molecular weight organic complexing agent and optionally other complexing agents with a double metal cyanide salt, e.g. zinc hexacyanocobaltate.

Exemplary double metal cyanide (DMC) complex catalysts for use in alkoxylating the vegetable oil include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. The double metal cyanide (DMC) catalysts more preferred are those capable of preparing "ultra-low" unsaturation polyether polyols. Such catalysts are disclosed in U.S. Pat. Nos. 5,470,813 and 5,482,908, and 5,545,601, the entire contents of which are herein incorporated by reference thereto. Particularly preferred herein are those zinc hexacyanocobaltate catalysts prepared by the methods described in U.S. Pat. No. 5,482,908.

The DMC catalyst concentration is chosen to ensure a good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.01 wt. %, based on the amount of polyol to be produced. The DMC catalyst may be in an amount ranging between any combination of these values, inclusive of the recited values.

As those skilled in the art are aware, an organic complexing ligand may be included with the DMC catalyst. Any organic complexing ligand may be part of the DMC catalyst in the process of the present invention, such as the organic complexing ligands described in U.S. Pat. Nos. 3,404,109, 3,829,505, 3,941,849, 5,158,922 and 5,470,813, as well as in EP 0,700,949, EP 0,761,708, EP 0,743,093, WO 97/40086 and JP 4,145,123. Such organic complexing ligands include water-soluble organic compounds with heteroatoms, such as oxygen, nitrogen, phosphorus or sulfur, which can form complexes with the DMC compound. Preferred as organic complexing ligands, are alcohols, aldehydes, ketones, ethers, esters, amides, ureas, nitriles, sulfides and mixtures thereof. More preferred organic complexing ligands include water-soluble aliphatic alcohols, such as, for example, ethanol, isopropanol, n-butanol, iso-butanol, sec-butanol and tert-butanol. Tert-butanol is most preferred.

The DMC catalysts may optionally contain at least one functionalized polymer. "Functionalized polymer" as used herein is a polymer or its salt that contains one or more functional groups including oxygen, nitrogen, sulfur, phosphorus or halogen. Examples of functionalized polymers preferred in the inventive process include, but are not limited to, polyethers, polyesters, polycarbonates, polyalkylene glycol sorbitan esters, polyalkylene glycol glycidyl ethers, polyacrylamides, poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof, maleic acids, styrenes and maleic anhydride copolymers and the salts thereof, block copolymers composed of branched chain ethoxylated alcohols, alkoxylated alcohols such as NEODOL (sold commercially by Shell Chemical Co.), polyether, polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, polyvinyl methyl ketones, poly(4-vinylphenols), oxazoline polymers, polyalkyleneimines, hydroxyethylcelluloses, polyacetals, glycidyl ethers, glycosides, carboxylic acid esters of polyhydric alcohols, bile acids and their salts, esters or amides, cyclodextrins, phosphorus compounds, unsaturated carboxylic acid esters and ionic surface- or interface-active compounds. Polyether polyols are most preferably used as the functionalized polymer herein.

Where used, functionalized polymers may be present in the DMC catalyst in an amount of from 2 to 80 wt. %, preferably, from 5 to 70 wt. %, more preferably, from 10 to 60 wt. %, based on the total weight of DMC catalyst. The functionalized polymers may be present in the DMC catalyst in an amount ranging between any combination of these values, inclusive of the recited values. In addition, a catalyst polyol suspension, such as described in U.S. Pat. No. 6,699,961, may be used.

The DMC catalysts used in alkoxylating the vegetable oil may be employed in semi-batch, continuous and other reactor configurations. As known to those skilled in the art, the semi-batch process is widely used to prepare polyethers and polyether-ester polyols. Reactors for these processes are known to utilize a range of mixing conditions with energy inputs from 0.5 to 20 horsepower per 1,000 gal. with preferred mixing energies of 1 to 8 hp per 1,000 gal. proving particularly useful. Those skilled in the art will appreciate that the optimum energy input may vary with process parameters such oxide addition time and with product viscosity, e.g., a greater amount of energy may be preferred for products with higher viscosities. Other process conditions, which may be useful, include purging the reactor oxide-feed tube or pipe with nitrogen or another inert fluid or gas after completion of the oxide feed.

In a continuous reactor to produce polyethers, the DMC catalyst can be charged to the reactors as a slurry in polyether or as a powder. A wide range of polyethers can be used as the suspension agent for slurries including various glycols such propylene glycol, 1,4 butane diol, ethylene glycol and alkoxylates of diols. Various triols, tetrols, pentols etc. and alkoxylates of these alcohols may also be used. The selection of a suspending agent may depend on a number of factors including availability at that site and product parameters such as viscosity. In some instances, it may be particularly desirable to use a high-shear mixer or similar device to create a suspension with a low tendency to settle while it is in the catalyst charge vessel.

The inventors herein have found in producing both petroleum-derived and vegetable oil-based polyols that DMC catalysts may appear to be inactive when initially charged to a starter. The double metal cyanide catalyst undergoes an activation process in the presence of PO. The rate of activation of the catalyst may be influenced by applying vacuum to the reactor with or without a nitrogen purge and by increasing the concentration of oxide added to the reactor after the stripping procedure is complete. There also can be an advantage to activating at one temperature and changing to other temperatures for a portion of the process; for example using a lower temperature for activation (e.g., 105° C.) and completing the major part of the alkoxylation at a higher temperature (e.g., 130° C.).

In those polyol production processes designed to operate at low DMC catalyst levels, propylene oxide quality and ethylene oxide quality may be important in obtaining a stable process and in producing a product with low amounts of contaminants. Low levels of alkalinity or water in the propylene oxide can potentially inhibit or deactivate the catalyst, thereby resulting in high propylene oxide concentrations in the reactors and creating a safety hazard. The permissible water and alkalinity ranges are dependent on both catalyst level and catalyst activity. For systems designed to operate at DMC catalyst levels in the range of 20 to 30 ppm, a propylene oxide alkalinity of less than 3 ppm as potassium hydroxide is preferred. The limiting values for alkalinity and water content will vary depending on the molecular weight of the polyol, with these parameters being more important in the alkoxylation of low molecular weight polyols. In polyol production processes operating near the process limits, water levels in the range of several hundred ppm to a thousand ppm can affect process stability. The limiting values of these components may also be related to process type with the continuous process and the semi-batch process with the continuous addition of a low molecular weight starter being more sensitive than a conventional semi-batch process.

The organic components in the ethylene oxide and propylene oxide are less important for process stability than the water content or alkalinity; however, the presence of these materials can affect product quality. Propylene oxide can contain high molecular weight polypropylene oxide that can affect the foaming process in the conversion of polyols and isocyanates to polyurethane foams. High molecular weight polypropylene oxide can cause either foam collapse or affect cell size. It may be necessary to use a carbon treatment of the propylene oxide or to use other processes to remove the high molecular weight polypropylene oxide. Low molecular weight components like propionaldehyde, methyl formate, methyl propylether, methyl isopropylether, acetaldehyde, and furan may require an additional polyol process step to remove these components prior to foam manufacture. These light components can generally be removed by a stripping process.

The vegetable oil-based polyols preferably have a nominal functionality in the range of 1.5 to 6, more preferably 2 to 4 and a molecular weight in the range of 700 to 10,000, most preferably from 1000 to 7,000 Da. The vegetable oil-based polyols useful in making the flexible foams of, the present invention may have a functionality and molecular weight in an amount ranging between any combination of these values, inclusive of the recited values.

The alkoxylated natural oil-based polyol(s) useful in the present invention have the natural oil content of at least 10% by weight, preferably, at least 20% by weight and most preferably at least 30% by weight.

Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula, $$Q(NCO)_n$$

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclo-hexane (isophorone diisocyanate; e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4''-triisocyanate; polyphenyl-polymethylene-polyisocyanates of the type which may be obtained by condensing aniline with formaldehyde, followed by phosgenation (crude MDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in. U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI); and polyisocyanates containing carbodiimide groups, urethane groups, allophanate groups, isocyanurate groups, urea groups, or biuret groups (modified polyisocyanates).

Isocyanate-terminated prepolymers may also be employed in the preparation of the flexible foams of the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

The inventive polyurethane forming formulation optionally may include one or more non-vegetable oil-based (i.e., petrochemically derived) polyols such as polyethers, polyesters, polyacetals, polycarbonates, polyesterethers, polyester carbonates, polythioethers, polyamides, polyesteramides, polysiloxanes, polybutadienes and polyacetones. The non-vegetable oil-based polyol may preferably be made in the presence of double metal cyanide (DMC) catalysts.

Suitable blowing agents for the production of polyurethane foams in accordance with the present invention include but are not limited to compounds such as water, carbon dioxide, methylene chloride, acetone, fluorocarbons, hydrochlorofluorocarbons, perfluorocarbons, and low boiling hydrocarbons. Some examples of suitable hydrochlorofluoro-carbons are 1,1-dichloro-1-fluoroethane (HCFC-141 b), 1-chloro-1, 1-difluoroethane (HCFC-142b), and chlorodifluoro-methane (HCFC-22). Examples of suitable hydrofluoro-carbons are 1,1,1,3,3-pentafluoro-propane (HFC-245fa), 1,1,1,2-tetrafluoro-ethane (HFC-134a), 1,1,1,3,3,3-hexafluoro-propane (HFC-236ea), 1,1,2,3,3,3-hexafluoropropane (HFC-236ea), and 1,1,1,4,4,4-hexafluorobutane (HFC-356mffm). Examples of suitable perfluorinated hydrocarbons are perfluoropentane and perfluoro-hexane. Examples of suitable hydrocarbons are isomers of butane, pentane, cyclopentane, hexane, and mixtures of thereof. Water and carbon dioxide are more preferred blowing agents, with water being most preferred.

In accordance with the present invention, the quantity of blowing agent used is typically that which will produce foams having the desired density. As one of ordinary skill in the art would know and understand, it is necessary to use a larger quantity of blowing agent to form a lower density foam while a higher density foam requires a smaller quantity of blowing agent. The quantity of blowing agent used in the present invention should produce a foam having a density ranging between any combination of these upper and lower values, inclusive, e.g. from at least about 0.5 pcf (8 kg/m$^3$) to about 20 pcf (320.4 kg/m$^3$), preferably from about 1.0 pcf (16 kg/m$^3$) to about 10 pcf (160.2 kg/m$^3$), more preferably from about 1.2 pcf (19.2 kg/m$^3$) to about 8 pcf (128 kg/m$^3$), and most preferably from about 1.5 pcf (24 kg/m$^3$) to about 5 pcf (80.1 kg/m$^3$).

Suitable additives which may optionally be included in the polyurethane forming formulations of the present invention include, for example, foam stabilizers, catalysts, cell regulators, reaction inhibitors, flame retardants, plasticizers, pigments, fillers, etc. Foam stabilizers which may be considered suitable for use in the inventive process include, for example, polyether siloxanes, and preferably those which are insoluble in water. Compounds such as these are generally of such a structure that copolymers of ethylene oxide and propylene oxide are attached to a polydimethylsiloxane residue. Such foam stabilizers are described in, for example, U.S. Pat. Nos. 2,834,748, 2,917,480 and 3,629,308. Particularly preferred would be cell stabilizers commonly used in the production of flexible conventional polyurethane foam such as NIAX L-618, L-620, L-635 and L-670 sold commercially by Momentive Performance Materials and Tegostab B-4900, B-2370, B-8244 and B-8255 sold commercially by Evonik.

Catalysts suitable for the flexible foam forming process of the present invention include those which are known in the art. These catalysts include, for example, tertiary amines, such as triethylamine, tributylamine, N-methylmorpholine, N-ethylmorpholine, N,N,N',N'-tetramethylethylenediamine, pentamethyl-diethylenetriamine and higher homologues (as described in, for example, DE-A 2,624,527 and 2,624,528), 1,4-diazabicyclo(2.2.2)octane, N-methyl-N'-dimethyl-aminoethylpiperazine, bis-(dimethylaminoalkyl)piperazines, N,N-dimethylbenzylamine, N,N-dimethylcyclohexylamine, N,N-diethyl-benzylamine, bis-(N,N-diethylaminoethyl) adipate, N,N,N',N'-tetramethyl-1,3-butanediamine, N,N-dimethyl-β-phenylethylamine, 1,2-dimethyl-imidazole, 2-methylimidazole, monocyclic and bicyclic amines together with bis-(dialkylamino)alkyl ethers, such as 2,2-bis-(dimethylaminoethyl) ether.

Other suitable catalysts which may be used in producing the inventive polyurethane foams include, for example, organometallic compounds, and particularly, organotin compounds. Organotin compounds which may be considered suitable include those organotin compounds containing sulfur. Such catalysts include, for example, di-n-octyltin mercaptide. Other types of suitable organotin catalysts include, preferably tin(II) salts of carboxylic acids such as, for example, tin(II) acetate, tin(II) octoate, tin(II) ethylhexoate and/or tin(II) laurate, and tin(IV) compounds such as, for example, dibutyltin oxide, dibutyltin dichloride, dibutyltin diacetate, dibutyltin dilaurate, dibutyltin maleate and/or dioctyltin diacetate.

Further examples of suitable additives, which may optionally be included in the flexible polyurethane foams of the present invention can be found in Kunststoff-Handbuch, volume VII, edited by Vieweg & Hochtlen, Carl Hanser Verlag, Munich 1993, 3rd Ed., pp. 104 to 127, for example. The relevant details concerning the use and mode of action of these additives are set forth therein.

EXAMPLES

The present invention is further illustrated, but is not to be limited, by the following examples in which all quantities given in "parts" and "percents" are understood to be by weight, unless otherwise indicated.

Preparation of a Castor Oil-Based Polyol

POLYOL A: A glycerin-initiated polyether polyol containing an EO/PO mixed block produced using DMC catalysis and having a hydroxyl number of about 56 mg KOH/g; an EO content=7.4%; and % primary OH groups=10%.

POLYOLS B through O were prepared as follows:
Castor oil (6914 g) was charged to a reactor along with a double metal cyanide catalyst prepared according to the procedure disclosed in U.S. Pat. No. 5,482,908 (0.6-1.2 g). Phosphoric acid (10 to 250 ppm) is optionally added to the castor oil depending on the quality of the castor oil. This mixture was heated to 130° C. with nitrogen stripping of the polyol/catalyst blend. Propylene oxide and/or ethylene oxide was charged to activate the catalyst. After activation, the reactor temperature was maintained at 130° C. and propylene oxide and/or ethylene oxide were added over a 2.5-4 hour period. After digestion at 130° C. for 0.5 hours, the polyether was stripped to remove any unreacted propylene oxide of ethylene oxide, cooled and discharged. The characteristics of these POLYOLS were as follows:

POLYOL B: Castor oil initiated; alkoxylated at PO/EO ratio of 55/45; OH Number=56.3; Total EO content 29.5%; EO content of the alkoxylate chain 43.6%; % primary OH groups=24%.

POLYOL C: Castor oil initiated; 4.6% of total EO alkoxylated at PO/EO ratio of 89/11 with 2.4% of the total being fed during the transition from the PO/EO ratio of 89/11 to a PO/EO ratio of 25/75, 4.2% of the total EO alkoxylation at a PO/EO ratio of 25/75 and 10.8% of the total EO being fed during the transition from the PO/EO ratio of 25/75 to a PO/EO ratio of 0/100; OH Number=55.4; Total EO content=22%; EO content of the alkoxylate chain=33.0%; % primary OH groups=43.2%.

POLYOL D: Castor oil initiated; 4.4% of total EO alkoxylated at PO/EO ratio of 89/11 with 2.4% of the total being fed during the transition from the PO/EO ratio of 89/11 to a PO/EO ratio of 25/75, 14.8% of the total EO alkoxylation at a PO/EO ratio of 25175 and 1.2% of the total EO being fed during the transition from the PO/EO ratio of 25/75 to a PO/EO ratio of 0/100; OH Number=55.2; Total EO content=21.8%; EO content of the alkoxylate chain=32.8%; % primary OH groups=41.1%.

POLYOL E: Castor oil initiated; alkoxylated at PO/EO ratio of 69/31; OH Number=57; Total EO content=20%; EO content of the alkoxylate chain=30.3%; % primary OH groups=19.7%.

POLYOL F: Castor oil initiated; alkoxylated at PO/EO ratio of 71/29; OH Number=56; Total EO content=19.1%; EO content of the alkoxylate chain=28.6% primary OH groups=19.7%.

POLYOL G: Castor oil initiated; alkoxylated at PO/EO ratio of 68/32 for 95% of the alkoxylation (based on total batch weight) and 5% all PO end cap; OH Number=55; Total EC) content=19.1%; EO content of the alkoxylate chain=28.4%; % primary OH groups=9.6%.

POLYOL H: Castor oil initiated; alkoxylated at PO/EO ratio of 71/29 for 95% of the alkoxylation (based on the total batch weight) and a 5% all PO end cap; OH Number=56.4; Total EO content=17.5%; EO content of the alkoxylate chain=26.3%; % primary OH groups=12.4%.

POLYOL I: Castor oil initiated; alkoxylated at PO/EO ratio of 76/24; OH Number=53.5; Total EO content=15%; EO content of the alkoxylate chain=22.0%; % primary OH groups=15.3%.

POLYOL J: Castor oil initiated; alkoxylated at PO/EO ratio of 75/25 for 95% of the alkoxylation (based on total batch weight) and a 5% all PO end cap; OH Number=56.1; Total EO content=15%; EO content of the alkoxylate chain=21.6%; % primary OH groups=10.1%.

POLYOL K: Castor oil initiated; alkoxylated at PO/EO ratio of 74/26 for 92.5% of the alkoxylation (based on the total batch weight) and a 7.5% all PO end cap; OH Number=56.1; Total EO content=15%; EO content of alkoxylate chain=22.5%; % primary OH groups=7.5%.

POLYOL L: Castor oil initiated; alkoxylated at PO/EO ratio of 79/21; OH Number=52.8; Total EO content=14.5%; EO content of the alkoxylate chain=21.1%; % primary OH groups=18.9%.

POLYOL M: Castor oil initiated; alkoxylated at PO/EO ratio of 82/18; OH Number=56.1; Total EO content=11.5%; EO content of the alkoxylate chain=17.3%; % primary OH groups=9.3%.

POLYOL N: Castor oil initiated; alkoxylated at PO/EO ratio of 89/11; OH Number=55.6; Total EO content=7.5%; EO content of the alkoxylate chain=11.2%; % primary OH groups=13.9%.

POLYOL O: Castor oil initiated; alkoxylated at PO/EO ratio of 100/0; OH Number=57.3; Total EO content=0%; EO content of the alkoxylate chain=0%; % primary OH groups=4.7%.

POLYOL P: Glycerin initiated; alkoxylated with propylene oxide only using KOH as the alkoxylation catalyst with residual KOH being removed; OH Number=56; EO Content=0; EO content of the alkoxylate chain=0%; % primary. OH groups <3%.

The properties of the foams described in Tables 1 and 2 were measured in accordance with ASTM D3574 procedures except as noted.

Density is reported as pounds per cubic foot.

Air flow is reported as standard cubic feet per minute measured on 2×2×1" specimens using a AMSCOR Model 1377 Foam Porosity instrument.

The IFD values are reported as pounds per 50 square inch.

Return Values are reported as % recovery of the original 25% IFD.

S.F. 65%/25% is the 65% IFD divided by the 25% IFD

Tensile strength is reported as pounds per square inch.

Elongation is reported as a percentage.

Tear strength is reported in pli.

Compression set is reported as the percentage recovery of the deflected height after 90% compression ($C_d$)

HACS 75% is reported as the percentage recovery of the deflected height after 75% compression ($C_d$)

Wet Set 50% is reported as the percentage recovery of the original height after 50% compression ($C_t$) the method is described in U.S. Pat. No. 5,549,841.

Examples 1-16

Flexible conventional polyurethane foams were produced using 100 parts by weight of the POLYOL indicated in Table 1; 3.3 parts by weight of distilled water; 1.2 parts by weight of the silicone surfactant which is commercially available from Momentive Performance Materials under the name Niax L-635; 0.2 parts by weight of the stannous octoate catalyst which is commercially available from Air Products under the name Dabco T-9; 0.16 parts by weight of the amine catalyst commercially available from Momentive Performance Materials under the name Niax C-183; and toluene diisocyanate commercially available from Bayer MaterialScience as Mondur TD-80, in an amount necessary to achieve an NCO/OH Index of 103. The properties of these foams are reported in Table 1.

TABLE 1

| Ex. | 1* | 2* | 3* | 4 | 5 | 6 | 7 | 8 |
|---|---|---|---|---|---|---|---|---|
| POLYOL | B | C | D | E | F | G | H | I |
| % EO | 43.6 | 33.0 | 32.8 | 30.3 | 28.6 | 28.4 | 26.3 | 22.0 |
| % primary OH | 24 | 43.2 | 41.1 | 19.7 | 19.7 | 9.6 | 12.4 | 15.3 |
| % EO + % Primary OH | 67.6 | 76.2 | 73.9 | 50 | 48.3 | 38 | 38.7 | 37.3 |
| NCO/OH | 103 | 103 | 103 | 103 | 103 | 103 | 103 | 103 |
| Density | 1.85 | 1.86 | 1.77 | 1.93 | 1.93 | 1.92 | 1.89 | 1.85 |
| Resilience | 25 | 22 | 22 | 41 | 40 | 41 | 42 | 39 |
| Air Flow | 0.06 | 0.06 | 0.39 | 2.16 | 3.02 | 3.93 | 4.34 | 4.31 |
| IFD Height | 4.05 | 4 | 4.07 | 4.04 | 4.05 | 4.03 | 4.04 | 4.05 |
| IFD 25% | 32 | 34 | 32 | 31 | 31 | 29 | 29 | 28 |
| IFD 65% | 66 | 68 | 65 | 63 | 63 | 58 | 57 | 55 |
| IFD 25% Return | 22 | 23 | 22 | 22 | 22 | 21 | 21 | 20 |
| Return Val @ 25% | 67 | 67 | 69 | 71 | 72 | 73 | 72 | 71 |
| S.F. 65%/25% | 2.06 | 2.01 | 2.04 | 2.01 | 2.01 | 2.01 | 1.97 | 1.95 |
| Tensile Strength | 19.29 | 20.31 | 19.04 | 19.24 | 17.35 | 18.23 | 17.73 | 17.60 |
| Elongation | 283.2 | 265.2 | 272.6 | 267.2 | 236.0 | 276.0 | 255.8 | 277.6 |
| Tear Str. | 2.59 | 2.55 | 2.79 | 2.74 | 2.62 | 2.56 | 2.43 | 2.54 |
| Comp. Set 90% | 53.92 | 28.91 | 36.67 | 22.73 | 25.89 | 15.26 | 21.10 | 21.16 |
| HACS 75% | 17.62 | 16.32 | 22.88 | 17.49 | 13.52 | 10.79 | 10.03 | 8.86 |
| Wet Set 50% | 22.76 | 14.19 | 24.41 | 6.20 | 6.09 | 6.33 | 4.99 | 6.37 |
| Foam Processing | Slightly tight | Slightly Tight | Slightly tight | Good | Good | Good | Good | Good |

| Ex. | 9 | 10 | 11 | 12* | 13* | 14* | 15* | 16* |
|---|---|---|---|---|---|---|---|---|
| POLYOL | J | K | L | M | N | O | P | A |
| % EO | 21.6 | 22.5 | 21.1 | 17.3 | 11.2 | 0 | 0 | 12.0 |
| % primary OH | 10.1 | 7.5 | 18.9 | 9.3 | 13.9 | 4.7 | <3 | 10 |
| % EO + % Primary OH | 31.7 | 30.0 | 40.0 | 26.6 | 25.1 | 4.7 | 4 | 18 |
| NCO/OH | 103 | 103 | 103 | 103 | 103 | 103 | 103 | 103 |
| Density | 1.91 | 1.85 | 1.85 | NM | NM | NM | 1.78 | 1.92 |
| Resilience | 42 | 41 | 42 | NM | NM | NM | 44 | 39 |
| Air Flow | 4.7 | 4.91 | 4.55 | NM | NM | NM | 4.83 | 4.14 |
| IFD Height | 4.09 | 4.08 | 4.08 | NM | NM | NM | 4.09 | 4.03 |
| IFD 25% | 28 | 27 | 28 | NM | NM | NM | 22.54 | 26.63 |
| IFD 65% | 56 | 53 | 56 | NM | NM | NM | 45.75 | 52.52 |
| IFD 25% Return | 20 | 19 | 20 | NM | NM | NM | 17.16 | 19.48 |
| Return Val @ 25% | 73 | 72 | 72 | NM | NM | NM | 76.16 | 73.15 |
| S.F. 65%/25% | 1.98 | 1.97 | 1.97 | NM | NM | NM | 2.03 | 1.97 |
| Tensile Strength | 17.53 | 16.99 | 17.79 | NM | NM | NM | 16.8 | 17.38 |
| Elongation | 257.3 | 265.9 | 271.5 | NM | NM | NM | 272.9 | 294 |
| Tear Str. | 2.61 | 2.50 | 2.65 | NM | NM | NM | 2.25 | 2.45 |
| Comp. Set 90% | 21.52 | 16.75 | 26.14 | NM | NM | NM | 4.08 | 12.28 |
| HACS 75% | 7.42 | 7.01 | 9.92 | NM | NM | NM | 4.27 | 5.45 |
| Wet Set 50% | 622 | 4.65 | 4.14 | NM | NM | NM | 2.39 | 2.46 |
| Foam Processing | Good | Good | Good | Center split | Center Split | Center split | small internal splits | Good |

*Comparative Example

Examples 17-32

Flexible polyurethane foams were produced using 100 parts by weight of the POLYOL indicated in Table 2; 4.2 parts by weight of distilled water; 1.2 parts by weight of the silicone surfactant which is commercially available from Momentive Performance Materials under the name Niax L-635; 0.22 parts by weight of the stannous octoate catalyst which is commercially available from Air Products under the name Dabco T-9; 0.15 parts by weight of the amine catalyst commercially available from Momentive Performance Materials under the name Niax C-183; and toluene diisocyanate commercially available from Bayer MaterialScience as Mondur TD-80 in the amount necessary to achieve an NCO/OH Index of 105. The properties of these foams are reported in Table 3.

TABLE 3

| Ex. | 17* | 18* | 19* | 10 | 21 | 22 | 23 | 24 |
|---|---|---|---|---|---|---|---|---|
| POLYOL | B | C | D | E | F | G | H | I |
| % EO | 43.6 | 33.0 | 32.8 | 30.3 | 28.6 | 28.4 | 26.3 | 22.0 |
| % primary OH | 24 | 43.2 | 41.1 | 19.7 | 19.7 | 9.6 | 12.4 | 15.3 |
| % EO + % Primary OH | 67.6 | 76.2 | 73.9 | 50 | 48.3 | 38 | 38.7 | 37.3 |
| NCO/OH | 105 | 105 | 105 | 105 | 105 | 105 | 105 | 105 |
| Density | 1.53 | 1.49 | 1.53 | 1.57 | 1.58 | 1.63 | 1.58 | 1.51 |
| Resilience | 24 | 24 | 28 | 36 | 35 | 37 | 37 | 37 |
| Air Flow | 0.17 | 0.37 | 0.47 | 3.05 | 4.13 | 4.59 | 5.19 | 5.16 |
| IFD Height | 3.96 | 3.90 | 3.89 | 3.91 | 3.96 | 3.86 | 3.97 | 3.97 |
| IFD 25% | 39 | 38 | 39 | 33 | 31 | 30 | 32 | 38 |
| IFD 65% | 78 | 76 | 79 | 68 | 64 | 63 | 64 | 57 |
| IFD 25% Return | 25 | 23 | 24 | 21 | 20 | 19 | 21 | 18 |
| Return Val @ 25% | 64 | 61 | 62 | 63 | 64 | 63 | 66 | 65 |
| S.F. 65%/25% | 2.02 | 2.02 | 2.00 | 2.07 | 2.05 | 2.08 | 2.03 | 2.08 |
| Tensile Strength | 16.11 | 18.30 | 19.00 | 18.90 | 17.50 | 17.80 | 16.83 | 16.28 |
| Elongation | 154.9 | 197.2 | 177.4 | 250.5 | 220.4 | 218.1 | 215.6 | 234.8 |
| Tear Str. | 2.53 | 2.45 | 2.49 | 2.57 | 2.79 | 2.89 | 2.45 | 2.33 |
| Comp. Set 90% | 22.83 | 21.00 | 21.02 | 10.76 | 20.20 | 12.48 | 17.86 | 24.25 |
| HACS 75% | 17.71 | 13.51 | 12.90 | 12.26 | 10.33 | 7.12 | 5.40 | 9.02 |
| Wet Set 50% | 27.68 | 23.29 | 21.51 | 21.2 | 14.21 | 8.55 | 7.38 | 8.82 |
| Foam Processing | Slightly Tight | Slightly Tight | Slightly Tight | Good | Good | Good | Good | Good |

| Ex. | 25 | 26 | 27 | 28* | 29* | 30* | 31* | 32* |
|---|---|---|---|---|---|---|---|---|
| POLYOL | J | K | L | M | N | O | P | A |
| % EO | 21.6 | 22.5 | 21.1 | 17.3 | 11.2 | 0 | 0 | 12.0 |
| % primary OH | 10.1 | 7.5 | 18.9 | 9.3 | 13.9 | 4.7 | <3 | 10 |
| % EO + % Primary OH | 31.7 | 30.0 | 40.0 | 26.6 | 25.1 | 4.7 | 4 | 18 |
| NCO/OH | 105 | 105 | 105 | 105 | 105 | 105 | 105 | 105 |
| Density | 1.61 | 1.54 | 1.51 | NM | NM | NM | 1.5 | 1.51 |
| Resilience | 37 | 37 | 37 | NM | NM | NM | 39 | 34 |
| Air Flow | 5.28 | 5.72 | 5.14 | NM | NM | NM | 5.48 | 3.35 |
| IFD Height | 3.89 | 3.96 | 3.94 | NM | NM | NM | 4.1 | 4.11 |
| IFD 25% | 29 | 29 | 28 | NM | NM | NM | 24 | 30 |
| IFD 65% | 59 | 58 | 57 | NM | NM | NM | 48 | 60 |
| IFD 25% Return | 18 | 19 | 18 | NM | NM | NM | 16 | 19 |
| Return Val @ 25% | 64 | 65 | 63 | NM | NM | NM | 68 | 65 |
| S.F. 65%/25% | 2.06 | 2.00 | 2.04 | NM | NM | NM | 2.03 | 2.05 |
| Tensile Strength | 16.78 | 17.58 | 17.61 | NM | NM | NM | 17.23 | 17.47 |
| Elongation | 231.1 | 225.3 | 238.8 | NM | NM | NM | 234.4 | 234.7 |
| Tear Str. | 2.49 | 2.40 | 2.36 | NM | NM | NM | 2.05 | 2.66 |
| Comp. Set 90% | 6.99 | 5.93 | 6.72 | NM | NM | NM | 5.98 | 12.19 |
| HACS 75% | 9.65 | 7.62 | 8.45 | NM | NM | NM | 6.61 | 11.45 |
| Wet Set 50% | 9.29 | 7.48 | 13.04 | NM | NM | NM | 3.79 | 6.33 |
| Foam Processing | Good | Good | Good | Center Split | Center Split | Center Split | Good | Good |

*Comparative Example

What is claimed is:

1. A flexible conventional polyurethane foam comprising the reaction product of:
   at least one polyisocyanate; and
   at least one natural oil alkoxylated in the presence of a double metal cyanide (DMC) catalyst having
      (a) an ethylene oxide content in the alkoxylated segment greater than 20% by weight,
      (b) a primary hydroxyl group content of at least 10%, with the sum of (a)+(b) being at least 30% but no greater than 60%,
   optionally at least one petroleum-based polyol,
   in the presence of at least one of blowing agent,
   and optionally in the presence of one or more surfactants, pigments, flame retardants, catalysts and fillers.

2. The flexible conventional polyurethane foam of claim 1 in which the at least one polyisocyanate is chosen from ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanatomethyl-cyclohexane (isophorone diisocyanate), 2,4- and 2,6-hexahydrotoluene diisocyanate, dicyclohexylmethane-4,4'-diisocyanate (hydrogenated MDI, or HMDI), 1,3- and 1,4-phenylene diisocyanate, 2,4- and 2,6-toluene diisocyanate (TDI), diphenylmethane-2,4'- and/or -4,4'-diisocyanate (MDI), naphthylene-1,5-diisocyanate, triphenyl-methane-4,4',4"-triisocyanate, polyphenyl-polymethylene-polyisocyanates (crude MDI), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret-containing polyisocyanates, isocyanate-terminated prepolymers and mixtures thereof.

3. The flexible conventional polyurethane foam of claim 1 in which the at least one polyisocyanate is toluene diisocyanate (TDI).

4. The flexible conventional polyurethane foam of claim 1 in which the natural oil is a vegetable oil.

5. The flexible conventional polyurethane foam of claim 1 in which the natural oil is castor oil.

6. The flexible conventional polyurethane foam of claim 1 in which the natural oil is alkoxylated with ethylene oxide and one or more alkylene oxides chosen from propylene oxide, 1,2-butylene oxide, 2,3-butylene oxide, isobutylene oxide, epichlorohydrin, cyclohexene oxide, styrene oxide, $C_5$-$C_{30}$ α-alkylene oxides, polycarboxylic anhydrides and lactones.

7. The flexible conventional polyurethane foam of claim 1 in which the double metal cyanide (DMC) catalyst is a zinc hexacyanocobaltate.

8. The flexible conventional polyurethane foam of claim 1 in which the alkoxylated natural oil is capped with ethylene oxide.

9. The flexible conventional polyurethane foam of claim 4 in which the vegetable oil is capped with ethylene oxide.

10. The flexible conventional polyurethane foam of claim 1 in which the natural oil content of the alkoxylated natural oil polyol is at least 20% by weight.

11. The flexible conventional polyurethane foam of claim 1 in which the petroleum-based polyol is chosen from polyethers, polyesters, polyacetals, polycarbonates, polyesterethers, polyester carbonates, polythioethers, polyamides, polyesteramides, polysiloxanes, polybutadienes and polyacetones.

12. The flexible conventional polyurethane foam of claim 1 in which the petroleum-based polyol is a polyether polyol.

13. The flexible conventional polyurethane foam of claim 1 in which the sum of (a)+(b) is at least 40% but no greater than 50%.

14. A process for making a flexible conventional polyurethane foam comprising reacting:
   at least one polyisocyanate; and
   at least one natural oil alkoxylated in the presence of a double metal cyanide catalyst having
      (a) an ethylene oxide content in the alkoxylated segment greater than 20% by weight,
      (b) a primary hydroxyl group content of at least 10%, with the sum of (a)+(b) being at least 30% but no greater than 60%,
   optionally at least one petroleum-based polyol,
   in the presence of at least one of blowing agent and
   optionally, a surfactant, pigment, flame retardant, catalyst or filler.

15. The process of claim 14 in which the at least one polyisocyanate is chosen from ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanatomethyl-cyclohexane (isophorone diisocyanate), 2,4- and 2,6-hexahydrotoluene diisocyanate, dicyclohexylmethane-4,4'-diisocyanate (hydrogenated MDI, or HMDI), 1,3- and 1,4-phenylene diisocyanate, 2,4- and 2,6-toluene diisocyanate (TDI), diphenylmethane-2,4'- and/or -4,4'-diisocyanate (MDI), naphthylene-1,5-diisocyanate, triphenyl-methane-4,4',4"-triisocyanate, polyphenyl-polymethylene-polyisocyanates (crude MDI), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret-containing polyisocyanates, isocyanate-terminated prepolymers and mixtures thereof.

16. The process of claim 14 in which the at least one polyisocyanate is toluene diisocyanate (TDI).

17. The process of claim 14 in which the natural oil is a vegetable oil.

18. The process of claim 14 in which the natural oil is castor oil.

19. The process of claim 14 in which the double metal cyanide (DMC) catalyst is a zinc hexacyanocobaltate.

20. The process of claim 14 in which the natural oil is alkoxylated with ethylene oxide and one or more alkylene oxides chosen from propylene oxide, 1,2-butylene oxide, 2,3-butylene oxide, isobutylene oxide, epichlorohydrin, cyclohexene oxide, styrene oxide, $C_5$-$C_{30}$ α-alkylene oxides, polycarboxylic anhydrides, lactones and mixtures thereof.

21. The process of claim 20 in which the natural oil is a vegetable oil.

22. The process of claim 20 in which the natural oil content of the alkoxylated natural oil polyol is at least 20% by weight.

23. The process of claim 14 in which the alkoxylated natural oil is capped with ethylene oxide.

24. The process of claim 14 in which the alkoxylated natural oil is an alkoxylated vegetable oil capped with ethylene oxide.

25. The process of claim 14 in which the petroleum-based polyol is chosen from polyethers, polyesters, polyacetals, polycarbonates, polyesterethers, polyester carbonates, polythioethers, polyamides, polyesteramides, polysiloxanes, polybutadienes and polyacetones.

26. The process of claim 14 in which the petroleum-based polyol is a polyether polyol.

27. The process of claim 14 in which the sum of (a)+(b) is at least 40% but no greater than 50%.

* * * * *